United States Patent [19]

Föhl

[11] Patent Number: 4,789,185
[45] Date of Patent: Dec. 6, 1988

[54] GAS GENERATOR FOR TIGHTENERS ON SAFETY-BELT RETRACTORS

[75] Inventor: Artur Föhl, Schorndorf, Fed. Rep. of Germany

[73] Assignee: TRW Repa GmbH, Alfdorf, Fed. Rep. of Germany

[21] Appl. No.: 79,815

[22] Filed: Jul. 30, 1987

[30] Foreign Application Priority Data

Aug. 8, 1986 [DE] Fed. Rep. of Germany ... 8621257[U]

[51] Int. Cl.⁴ .............................................. B60R 22/36
[52] U.S. Cl. ........................................ 280/806; 227/9; 60/632; 297/476
[58] Field of Search ............... 280/801, 802, 806, 805; 227/9, 10, 11; 60/632, 633, 635, 638; 297/472, 474, 476, 480

[56] References Cited

U.S. PATENT DOCUMENTS

| | | | |
|---|---|---|---|
| 4,385,775 | 5/1983 | Shimogawa et al. | 280/806 |
| 4,458,921 | 7/1984 | Chiba et al. | 280/806 |
| 4,541,504 | 9/1985 | Lassche | 280/806 |

Primary Examiner—Richard A. Bertsch
Attorney, Agent, or Firm—Tarolli, Sundheim & Covell

[57] ABSTRACT

A gas generator for a tightener in a safety-belt retractor comprises a cylindrical housing secured at one of its ends to a transition member between the housing of the retractor and a piston/cylinder drive of the tightener. At its other end the housing has a radial collar. The housing accommodates a propellant charge with a detonator. A hollow sleeve is inserted into the housing and has an outer diameter adapted to the inner diameter of the housing and an inner diameter adapted to a cylindrical capsule housing. The capsule housing has a bottom enclosing the propellant charge and is connected to a cylindrical base member which is inserted into the housing. The base member has a radial face bearing on the radial collar of the housing. The sleeve has a radially inwardly directed collar on the inner surface of which the bottom of the capsule housing bears.

9 Claims, 1 Drawing Sheet

GAS GENERATOR FOR TIGHTENERS ON SAFETY-BELT RETRACTORS

The invention relates to a gas generator for tighteners on safety-belt retractors. Tighteners for safety-belt retractors require a drive which executes within an extremely short time the tightening of the safety-belt at the very beginning of a crash situation. For this purpose a piston/cylinder drive is conventionally used, the piston of which is subjected to the gases generated by a pyrotechnical gas generator and engages via a pull cable on the periphery of a pulley on which the pull cable is wound with several turns. The rotary movement of the pulley is then transferred by a coupling means to the takeup saaft of the safety-belt takeup means.

The gas generator generally comprises a cylindrical housing which is secured at one of its two ends to a transition piece which is disposed between the housing of the safety-belt retractor and the cylinder of the piston/cylinder drive. The other end of the cylindrical housing comprises a radial inwardly directed collar. In the interior of the housing a pyrotechnical propellant charge with detonator is disposed. Since the propellant charge is introduced directly into the housing cavity the latter must be hermetically sealed from the outside. The housing bottom on the side of the piston/cylinder drive must however allow the gases liberated when the propellant charge burns to pass through so that they can penetrate into the cylinder. It is therefore constructed as thin burst bottom. Because of its complicated form and the close tolerances to be observed the production of such a housing is relatively complicated.

The present invention provides a gas generator allowing a simplified production and assembly.

According to the invention, a hollow cylindrical sleeve is inserted into the hollow cylindrically formed chamber of the housing said sleeve having an outer diameter adapted to the inner diameter of said chamber and an inner diameter adapted to the outer diameter of a cylindrical capsule housing with closed bottom which encloses the propellant charge and which is connected to a cylindrical base which is likewise inserted into the chamber of the housing and which bears with a radial engagement face on the radial collar of the housing, and the sleeve comprising a radially inwardly directed collar on the inner surface of which the bottom of the capsule housing bears.

In the gas generator according to the invention the housing has a simple form which is easy and economical to make. The hollow cylindrical sleeve preferably consisting of plastic and the insert comprising the capsule housing and the base are then inserted into said housing. This insert forms a prefabricated component which can be supplied by the manufacturer of the propellant charge. A burst bottom as component of the housing can be dispensed with because the closed bottom of the capsule housing ensures the desired function. The use of a hollow cylindrical sleeve which is inserted into the housing makes it easy to adapt the gas generator insert used to the constructional features and dimensions of the particular piston/cylinder drive.

To ensure a tight fit of the gas generator insert in the interior of the housing but nevertheless permit an easy assembly, the sleeve comprises on its inner peripheral face and preferably also on its outer peripheral face axia'ly extending ribs which extend over more than half the axial length of the sleeve and at their one end are provided with a run-up inclined edge. These ribs are preferably triangular in cross-section. They are distributed at uniform angular intervals over the periphery of the sleeve. Preferably, on the inner and outer peripheral face three such axial ribs are provided in each case, the ribs on the inner outer face being angularly offset with respect to those on the outer face by 60° in each case.

Furthermore, according to an advantageous embodiment of the invention the sleeve comprises on the outside of its radially inwardly directed collar radial ribs which are of triangular cross-section. These ribs ensure a uniform distribution of the axial pressure force with which the gas generator insert is pressed over the sleeve against the radially inwardly directed collar of the housing.

Further advantages and features of the invention will be apparent from the following description of an example of embodiment with the aid of the drawings, wherein.

Figure 1:
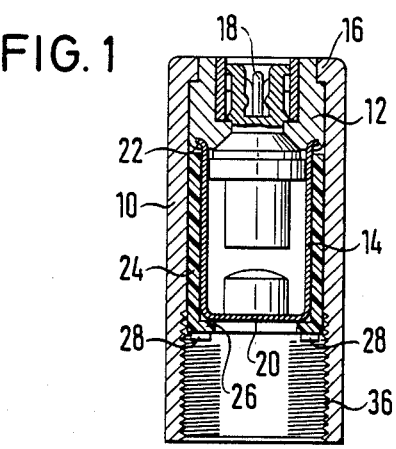
FIG. 1 is a longitudinal section of a gas generator with housing.
Figure 4:
FIG. 4 is a detailed view of the sleeve shown in FIG. 3 in cross-section.
Figure 5:
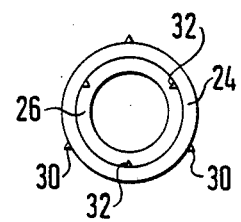
FIG. 5 is an end elevation of the sleeve shown in FIG. 3.

In the gas generator shown in FIG. 1 a gas generator insert is inserted into the cylindrical interior of a hollow cylindrical housing 10 and consists of a base 12 and a capsule housing 14 secured thereon. In the interior of said capsule housing 14 a propellant charge and a detonator are disposed. The housing 10 comprises a radially inwardly directed collar 16 on the inner side of which a step of the base 12 bears. The base 12 surrounds a plug socket designated generally by 18 which will not be described in detail here and serves for connection of the electrical firing lines. The cylindrical capsule housing 14 comprises a closed bottom 20 and surrounds a detonator and a propellant charge which will not be described in detail here. The end of the capsule housing 14, which consists of thinwalled metal sheet, particularly aluminium, opposite the bottom 20 is widened outwardly and connected by a bead connection 22 to the base 12. Whereas the outer diameter of the cylindrical base 12 corresponds at least approximately to the inner diameter of the hollow cylindrical housing 10, the cylindrical capsule housing 14 has an appreciably smaller diameter. A hollow cylindrical sleeve 24 of plastic such as polyamide is inserted into the annular intermediate space between the inner surface of the hollow cylindrical housing 10 and the outer periphery of the capsule housing 14. This sleeve 24 comprises at its end adjacent the bottom 20 of the capsule housing 14 a radially inwardly directed collar 26 on the inner surface of which the outer edge of the bottom 20 bears. On its outer side this radially inwardly directed collar 26 comprises three radial ribs 28 which are triangular in cross-section and arranged at angular intervals of 120° to each other. Such a rib 28 is illustrated in cross-section in FIG. 4. The cross-sectional form is that of an acute triangle.

Figure 6:
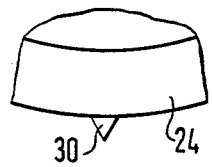
FIG. 6 is a detail from FIG. 5.
Figure 3:
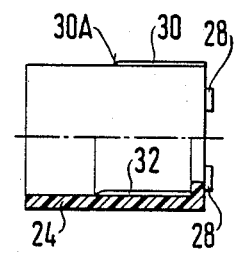
FIG. 3 is a partial section of a sleeve of the gas generator shown in FIG. 1.

On its outer surface the sleeve 24 comprises three axial ribs 30 which are angularly offset with respect to each other by 120° in each case and extend over somewhat more than half the length of the sleeve 24. They are provided with a run-up inclined edge 30A. On its inner face as well the sleeve 24 comprises three axial ribs 32 which extend over somewhat more than half the length of the sleeve 24 and are angularly offset by 120° to each other. The ribs 30 on the outer surface of the sleeve 24 are angularly offset by 60° in each case with respect to the ribs 32 on the inner surface and thus lie in each case on the angle bisecting line of the angular intervals between the ribs 32. The ribs 30, 32 are also triangular in cross-section; this can be seen clearly in the case of the ribs 30 in FIG. 6.

Figure 2:
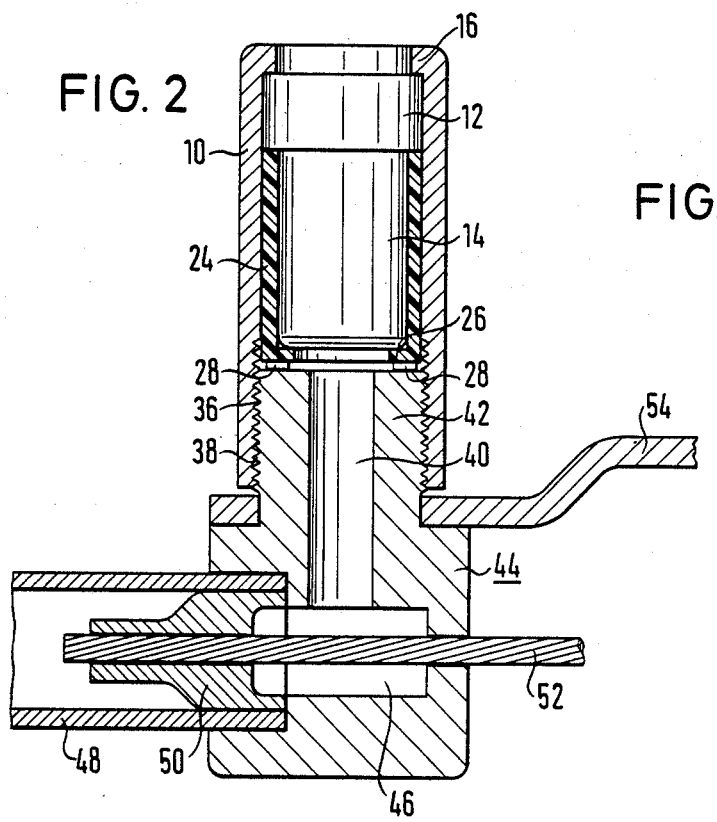
FIG. 2 is a schematic sectional view showing the assembly of the gas generator illustrated in FIG. 1 with a piston/cylinder drive of a tightener for safety-belt takeup means.

FIG. 2 shows a schematic simplified sectional view of the assembly of the gas generator with the piston/cylinder drive of a tightener for safety-belt takeup means. The tubular housing 10 comprises at its end opposite the collar 16 an internal thread 36 which fits on the external thread 38 on a cylindrical pin 42, provided with a continuous bore 40, of a transitional adapter piece 44. The bore 40 opens into a cavity 46 of the transition piece 44 which communicates with the interior of a cylinder 48 in which a piston 50 is slidingly displaceable. Anchored to the piston 50 is a pull cable 52 which engages the outer periphery of a pulley which is not illustrated.

On assembly the sleeve 24 is first pushed onto the capsule housing 14. The sleeve 24 with the gas generator insert inserted therein is then inserted through the open end of the sleeve 24 provided with the internal thread 36 into said sleeve until the step of the base 12 comes to bear on the inner face of the radially inwardly directed collar 16. The housing 10 is then screwed on the thread 38 of the cylindrical piece 42 until the tips of the radial ribs 28 come into contact with the outer end face of the piece 42. On subsequent further rotation of the housing the sleeve is pressed with deformation of the radial ribs 28 against the beading 22 of the base 12, the step of said base 12 thereby being pressed against the inner face of the radially inwardly directed collar 16 of the housing 10. In this manner a uniform area pressure with adequate sealing is achieved between the step of the base 12 and the inner face of the collar 16. By the ribs 28, 30 and 32 the gas generator insert is accommodated in the interior of the housing 10 free from play both axially and radially. The ribs 30, 32 also provide satisfactory centering of the gas generator insert in the housing 10 irrespective of relatively large production tolerances. The housing 10 can be made in simple manner by mass production techniques.

The assembly consisting of gas generator and piston/cylinder drive is secured by a fitting 54 on the housing of a safety-belt takeup means not shown. The fitting 54 comprises a bore through which the piece 42 extends and is clamped between the shoulder of the transition piece 44 bordering the piece 42 and the end face of the housing 10.

I claim:

1. A gas generator for a tightener in a safety-belt retractor, comprising a cylindrical housing which is secured at one of its two ends to a transition member between the housing of the safety-belt retractor and a piston/cylinder drive of the tightener and at its other end comprises a radial collar and accommodates in its interior a propellant charge with a detonator, a hollow cylindrical sleeve being inserted into a hollow cylindrical chamber formed inside of the housing, said sleeve having an outer diameter adapted to the inner diameter of said chamber and an inner diameter adapted to the outer diameter of a cylindrical capsule housing with a closed bottom which encloses the propellant charge and which is connected to a cylindrical base which is likewise inserted into said chamber of the housing, and which has a radial engagement face bearing on the radial collar of the housing, and the sleeve comprising a radially inwardly directed collar on the inner surface of which the bottom of the capsule housing bears.

2. The gas generator according to claim 1, wherein said sleeve comprises radial ribs on the outside of its radially inwardly directed collar, said ribs being triangular in cross-section.

3. The gas generator according to claim 1, wherein said sleeve comprises axially extending ribs on its inner peripheral face, said ribs extending over more than half the axial length of the sleeve and being provided with a run-up inclined edge at one of their ends.

4. The gas generator according to claim 3, wherein each of said ribs is arranged on the angle bisecting line of the equally angularly spaced ribs on the outer surface of the sleeve.

5. The gas generator according to claim 1, wherein said sleeve consists of plastic.

6. The gas generator according to claim 5, wherein said sleeve consists of a polyamide.

7. The gas generator according to claim 1, wherein said sleeve comprises axial ribs on its outer surface, said ribs extending over more than half the length of the sleeve and comprising a run-up edge.

8. A gas generator for a tightener used in a safety belt retractor, said gas generator comprising:
   a cylindrical housing having one end to be secured to a transition member associated with a piston/cylinder drive of the tightener, said cylindrical housing having a radial collar at the other end thereof, said cylindrical housing having an inner wall defining a hollow cylindrical chamber;
   a propellant charge and a detonator in said hollow cylindrical chamber;
   a cylindrical capsule having a closed end for storing said propellant charge therein and located in said hollow cylindrical chamber;
   a cylindrical sleeve located between said inner wall of said cylindrical housing defining said hollow cylindrical chamber and said cylindrical capsule and having an inwardly directed radial collar engaging the closed end of said cylindrical capsule for supporting said cylindrical capsule in said hollow cylindrical chamber of said cylindrical housing, said cylindrical sleeve having at least an outer surface portion engaging said inner wall of said cylindrical housing defining said hollow cylindrical chamber and at least an inner surface portion engaging the outer surface of said cylindrical capsule; and
   a cylindrical base located between said cylindrical capsule and said radial collar for connecting electric firing means with the detonator, said cylindrical base having radial surface means engaging said radial collar.

9. A gas generator according to claim 8 wherein said cylindrical base is attached to said cylindrical capsule.

* * * * *